United States Patent Office 3,036,351
Patented May 29, 1962

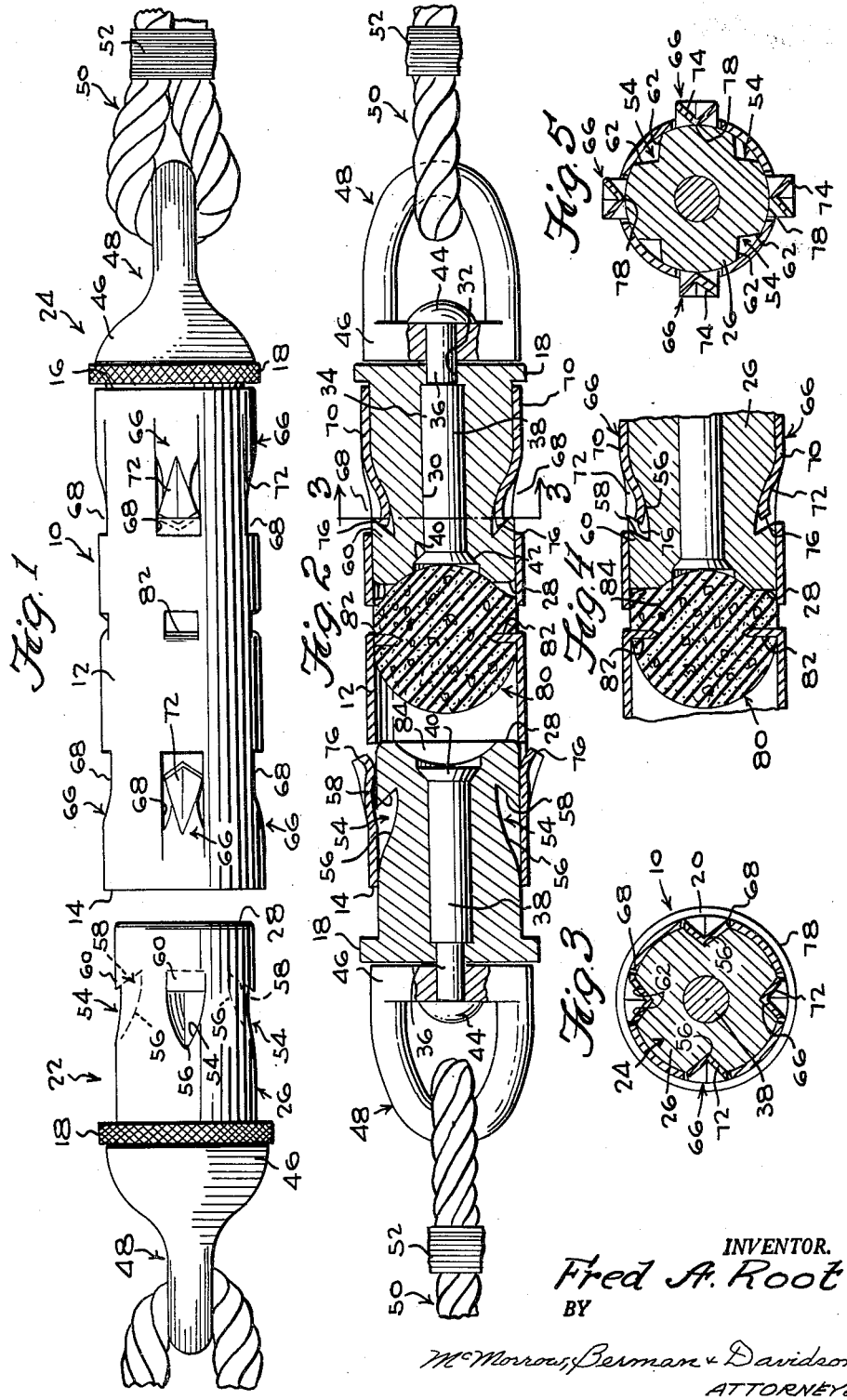

3,036,351
SWIVEL ROPE CONNECTOR
Fred A. Root, Box 293, Valdez, Alaska
Filed Apr. 22, 1960, Ser. No. 24,141
6 Claims. (Cl. 24—123)

This invention relates to a novel swivel rope connector.

The primary object of the invention is to provide a simple, reliable, and rugged device of the kind indicated, whose components are quickly and easily engageable and disengageable, for connecting and disconnecting rope ends, and which cannot become disengaged from each other under strain less than the breaking strain of the device.

Another object of the invention is to provide a device of the character indicated above, which is composed of a body on whose ends are separably mounted swivel eye end members to which rope ends are securable, the body and the end members having cooperating releasable detent means which are releasable only by forcing the end members toward the body and rotating the end members relative to the body, and resilient means on the body engageable by the end members when mounted on the body, which serves to maintain the detent means engageable and against release by rough handling of the ropes and the device under work conditions.

Other important objects and advantageous features of the invention will be apparent from the following description and the accompanying drawings, wherein, for purposes of illustration only, a specific form of the invention is set forth in detail.

In the drawings:

FIGURE 1 is a side elevation of a device of the invention, with ropes secured to its end members, one of the end members being shown separated from the body;

FIGURE 2 is a longitudinal section through the device, with portions broken away, and showing one of the end members fully engaged with the body and the other end member partially engaged with the body;

FIGURE 3 is a transverse section taken on the line 3—3 of FIGURE 2;

FIGURE 4 is a fragmentary longitudinal section taken through the device and showing an end member in process of being disengaged from the body; and, FIGURE 5 is a transverse section showing an end member rotated relative to the body with the locking tongues cammed out of their locking notches.

Referring in detail to the drawings, wherein like numerals designate like parts throughout the several views, the illustrated device comprises a body in the form of an elongated cylindrical sleeve 10 of resilient metal, such as spring bronze or the like, or of plastic, having a sidewall 12, and open first and second ends 14 and 16.

The plugs 22, 24 are similar and interchangeable, and comprise preferably solid cylindrical bodies 26 of diameters to have a sliding fit in the ends of the sleeve 10, and of lengths such that the squared inner ends 28 of the bodies 26 are spaced from each other, at the middle of the sleeve 10, when the plugs are engaged in and secured in the ends of the sleeve 10. The bodies 26 have axial bores extending therethrough which are composed of relatively large diameter inner portions 30 and smaller diameter outer portions 32, which define shoulders 34 therebetween. Swivel pins are engaged in the bores and have outer portions 36 journalled in the outer bore portions 32, and inner portions 38 journalled in the inner bore portions 30, the inner pin portions 38 having enlarged heads 40 on their inner ends which are engaged in enlarged annular recesses 42 in the inner ends of the bodies 26. Suitably fixed, as indicated at 44, on the outer ends of the outer pin portions 36 and rotatably bearing against related ends of the connector body 10, are circular heads 46 of swivel rope eyes 48, through which rope ends 50 are adapted to be engaged and secured, as indicated at 52. Knurled collars 18 are fixed on the outer ends of the bodies for use as hand grips in turning the plugs 22 and 24 relative to the sleeve 10, for disengaging the plugs from the sleeve.

At locations intermediate the ends of the bodies 26 of the plugs and spaced equidistantly therearound are similar lock notches 54 which have longitudinally curved bottoms 56 which are angled longitudinally inwardly and laterally inwardly relative to the axes of the bodies 26. The notches 54 have inner end surfaces 58 which are angled longitudinally outwardly and laterally outwardly relative to the axes of the bodies and meet the inward ends of the notch bottoms 56, so as to provide, in effect, hooks 60 at the inward ends of the notches. Further, as shown in FIGURE 3, the notch bottoms 56 are transversely concaved and are preferably V-shaped, and have laterally outwardly divergent sides 62.

For lockably and releasably engaging the notches 54 to lock the plugs 22, 24 in related ends of the sleeve 20, the sidewall 12 of the sleeve near the ends thereof is cut out to define longitudinally elongated and longitudinally inwardly extending spring locking tongues 66, and slots 68 through which the tongues freely work, the tongues being preferably integral at the longitudinally outward ends with the sleeve sidewall 12.

As shown in FIGURES 2 to 5, the locking tongues 66 have flat outer end portions 70 which merge, at their inward ends, into longitudinally and laterally inwardly curved inward end portions 72 which are V-shaped and have laterally outwardly divergent sides 74, the cross-sections of the V-shaped portions being substantially similar to that of the V-shaped bottoms 56 of the notches 54. As seen in FIGURE 2, the inner end portions 72 of the tongues 66 are slightly shorter than the notches 54 and are of substantially the same longitudinal curvature as the notch bottoms 56 and the inner end portions 72 of the tongues terminate in upturned terminal ends 76. As shown in FIGURE 2, the terminal ends 76 bear upwardly against the notch end surfaces 58, that is, beneath the hooks 60, when the tongues 66 are in locking engagement in the notches 54, and are tensioned laterally outwardly into forcible engagement with the hooks 60, so that outward pull on the rope ends 50 secured to the rope eyes 48 causes the notch end surfaces 58 to act as cams and force the tongue ends 76 deeper into the notches, whereby the plugs are securely locked in the ends of the sleeve 10.

In order to release the plugs from the sleeve 10 it is necessary to hold the sleeve 10 against both rotation and endwise movement, while forcing the plugs into the sleeve, accompanied by slight rotation of the plugs relative to the sleeve. Such inward movement of the plugs, as shown in FIGURE 4, moves the notch end surfaces 58 or hooks 60 inwardly away from and off of the terminal ends 76 of the tongues 66, so that the tongues are freed to flex outwardly; and slight rotation of the plugs then acts to dislodge the V-shaped tongue end portions 72 from conforming engagement in the notch bottoms 56, wherein their sides 74 were engaged with the notch sides 62, so that the apices 78 climb up sides 62 of the notch bottoms and the tongues are flexed upwardly into their slots 68 and then ride upon the exteriors of the plug bodies 26, as shown in FIGURE 5, whereat the plugs can be easily pulled out of the ends of the sleeve 10.

To produce locking engagements of the plugs 22, 24 in the ends of the sleeve 10, the plugs are simply pushed into the ends of the sleeve until the rope eye heads 46 approach the ends of the sleeve, whereat the plugs are rotated until the tongues 66 snap into the notches 54 and then pushed further inwardly to engage the inner end portions 72 of the tongues beneath the hooks 60.

For the purpose of eliminating truant inward movements of the plugs in the ends of the sleeve 10, such as might be produced by rough handling of the connector device, under conditions of service, and which would otherwise disengage the tongues 66 from the notches 54, a resilient outwardly tensioned stop member is provided in the sleeve 10 to be forcibly engaged by the inner ends of the plugs. Such a stop member can be as shown in FIGURES 2 and 4, a ball 80 of such as high-density foam rubber, which is larger in diameter than the space between the inner ends 28 of the plugs, when in their locked positions, and which is held in place in the sleeve 10 by means of prongs 82 struck out of the sidewall 12 of the sleeve 10 and engaged in the ball 80. As shown in FIGURES 2 and 4, the inner ends 28 of the plug bodies 26 preferably have axial recesses 84, opening to the recesses 42, into which related sides of the ball 80 can compress, for more secure engagement between the ball and the plugs.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A swivel rope connector comprising a body having ends, swivel rope connecting plugs on the ends of the body, and means releasably connecting said plugs on the ends of the body, said means comprising interengaged locking notches and locking spring tongues severally on the plugs and said body, said body being a sleeve having open ends, said plugs having bodies slidably fitting in the ends of the sleeve and having inner ends spaced from each other, said notches being in the plug bodies and said tongues being on the side wall of the sleeve, said notches being longitudinally elongated and having longitudinally and laterally inwardly angled bottoms and having longitudinally and laterally outwardly angled cam surfaces at their inner ends defining hooks, said tongues having outer ends connected to the sleeve sidewall, said tongues comprising substantially straight outer end portions and laterally inwardly and longitudinally angled inner end portions bearing upon the notch bottoms, said inner end portions of the tongues terminating in laterally outwardly angled terminal ends which bear laterally outwardly against said cam surfaces.

2. A swivel rope connector comprising a body having ends, swivel rope connecting plugs on the ends of the body, and means releasably connecting said plugs on the ends of the body, said means comprising interengaged locking notches and locking spring tongues severally on the plugs and said body, said body being a sleeve having open ends, said plugs having bodies slidably fitting in the ends of the sleeve and having inner ends spaced from each other, said notches being in the plug bodies and said tongues being on the side wall of the sleeve, said notches being longitudinally elongated and having longitudinally and laterally inwardly angled bottoms and having longitudinally and laterally outwardly angled cam surfaces at their inner ends defining hooks, said tongues having outer ends connected to the sleeve sidewall, said tongues comprising substantially straight outer end portions and laterally inwardly and longitudinally angled inner end portions bearing upon the notch bottoms, said inner end portions of the tongues terminating in laterally outwardly angled terminal ends which bear laterally outwardly against said cam surfaces, said notch bottoms being transversely concave and said inner end portions of the tongues being convex and having apices to ride on the sides of the notch bottoms and out of the notches when the plugs are pushed inwardly in the sleeve to disengage the cam surfaces from said terminal ends and rotated relative to the sleeve to cam the tongues out of the notches.

3. A swivel rope connector comprising a body having ends, swivel rope connecting plugs on the ends of the body, and means releasably connecting said plugs on the ends of the body, said means comprising interengaged locking notches and locking spring tongues severally on the plugs and said body, said body being a sleeve having open ends, said plugs having bodies slidably fitting in the ends of the sleeve and having inner ends spaced from each other, said notches being in the plug bodies and said tongues being on the side wall of the sleeve, said notches being longitudinally elongated and having longitudinally and laterally inwardly angled bottoms and having longitudinally and laterally outwardly angled cam surfaces at their inner ends defining hooks, said tongues having outer ends connected to the sleeve sidewall, said tongues comprising substantially straight outer end portions and laterally inwardly and longitudinally angled inner end portions bearing upon the notch bottoms, said inner end portions of the tongues terminating in laterally outwardly angled terminal ends which bear laterally outwardly against said cam surfaces, said notch bottoms being indented and V-shaped and having laterally outwardly divergent sides, said inner end portions of the tongues being V-shaped and conformably engaged in the notch bottoms and having apices to ride on sides of the notch bottoms and out of the notches when the plugs are pushed inwardly in the sleeve to disengage the cam surfaces from the terminal ends of the tongues and rotated.

4. A swivel rope connector comprising a body having ends, swivel rope connecting plugs on the ends of the body, and means releasably connecting said plugs on the ends of the body, said means comprising interengaged locking notches and locking spring tongues severally on the plugs and said body, said body being a sleeve having open ends, said plugs having bodies slidably fitting in the ends of the sleeve and having inner ends spaced from each other, said notches being in the plug bodies and said tongues being on the side wall of the sleeve, said notches being longitudinally elongated and having longitudinally and laterally inwardly angled bottoms and having longitudinally and laterally outwardly angled cam surfaces at their inner ends defining hooks, said tongues having outer ends connected to the sleeve sidewall, said tongues comprising substantially straight outer end portions and laterally inwardly and longitudinally angled inner end portions bearing upon the notch bottoms, said inner end portions of the tongues terminating in laterally outwardly angled terminal ends which bear laterally outwardly against said cam surfaces, longitudinally outward pulling of the plugs relative to the sleeve causing said cam surfaces to cam the terminal ends laterally inwardly and push the tongues into the notches, pushing of the plugs into the sleeve serving to remove the cam surfaces from the terminal ends of the tongues and enable rotation of the plugs relative to the sleeve to cam the tongues out of the notches, and resilient stop means secured within the sleeve with which the inner ends of the plug bodies are compressively engaged and prevented from being vagrantly pushed into the sleeve.

5. A swivel rope connector comprising a body having ends, swivel rope connecting plugs on the ends of the body, and means releasably connecting said plugs on the ends of the body, said means comprising interengaged locking notches and locking spring tongues severally on the plugs and said body, said body being a sleeve having open ends, said plugs having bodies slidably fitting in the ends of the sleeve and having inner ends spaced from each other, said notches being in the plug bodies and said tongues being on the side wall of the sleeve, said notches being longitudinally elongated and having longitudinally and laterally inwardly angled bottoms and having longitudinally and laterally outwardly angled cam surfaces at their inner ends defining hooks, said tongues having outer ends connected to the sleeve sidewall, said tongues comprising substantially straight outer end portions and laterally inwardly and longitudinally angled inner end portions bearing upon the notch bottoms, said inner end portions of the tongues terminating in laterally outwardly angled terminal ends which bear laterally outwardly against said cam surfaces, longitudinally outward pulling of the plugs relative to the sleeve causing said cam surfaces to cam the terminal ends laterally inwardly and push the tongues into the notches, pushing of the plugs into the sleeve serving to remove the cam surfaces from the terminal ends of the tongues and enable rotation of the plugs relative to the sleeve to cam the tongues out of the notches, and resilient stop means secured within the sleeve with which the inner ends of the plug bodies are compressively engaged and prevented from being vagrantly pushed into the sleeve, said stop means being a resilient and compressible ball.

6. A swivel rope connector comprising a cylindrical sleeve having open ends, said sleeve having a sidewall having circumferentially spaced longitudinally extending slots adjacent to its ends, said slots having outer and inner ends, longitudinally extending spring tongues disposed on said slots and having outer ends fixed to the sleeve at the outer ends of the slots, said tongues extending radially inwardly of the sleeve sidewall at laterally inward angles and having free inner ends, a swivel plug removably and rotatably engaged in the sleeve at each of its ends, said plugs having circumferentially spaced longitudinally extending notches therein in which said spring tongues are normally engaged, said plugs having longitudinally outwardly facing hooks at the inner ends of said notches in which the free ends of the tongues engage, and rope connecting means on the outer ends of the plugs, said notches being V-shaped in cross section and having oppositely angled cam sides, the plugs being rotatable relative to the sleeve to engage cam sides with the tongues so as to cam the tongues out of the notches and out of engagement with the hooks to enable withdrawal of the plugs from the sleeve.

References Cited in the file of this patent
UNITED STATES PATENTS

| | | |
|---|---|---|
| 195,400 | Richard | Sept. 18, 1877 |
| 807,069 | Geoffroy | Dec. 12, 1905 |
| 1,056,452 | Remhilt | Mar. 18, 1913 |
| 1,278,783 | Stoner | Sept. 10, 1918 |
| 1,347,515 | Lutz | July 27, 1920 |
| 1,380,244 | Otis | May 31, 1921 |
| 1,546,523 | Walaschek | July 21, 1925 |
| 1,599,050 | Helfenstein | Sept. 7, 1926 |
| 1,936,378 | Carr | Nov. 21, 1933 |
| 2,537,339 | Fishbein et al. | Jan. 9, 1951 |